(12) United States Patent
Ahmed

(10) Patent No.: US 10,043,058 B2
(45) Date of Patent: Aug. 7, 2018

(54) FACE DETECTION, REPRESENTATION, AND RECOGNITION

(71) Applicant: International Business Machines Corporation, Armonk, NY (US)

(72) Inventor: Mohamed N. Ahmed, Leesburg, VA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 15/065,021

(22) Filed: Mar. 9, 2016

(65) Prior Publication Data

US 2017/0262695 A1     Sep. 14, 2017

(51) Int. Cl.
 *G06K 9/00* (2006.01)
 *G06K 9/62* (2006.01)

(52) U.S. Cl.
 CPC ..... *G06K 9/00288* (2013.01); *G06K 9/00248* (2013.01); *G06K 9/00281* (2013.01); *G06K 9/6202* (2013.01); *G06K 9/6218* (2013.01); *G06K 9/6269* (2013.01)

(58) Field of Classification Search
 CPC .......... G06K 9/00288; G06K 9/00248; G06K 9/00281; G06K 9/6202; G06K 9/6218; G06K 9/6269
 See application file for complete search history.

(56) References Cited

U.S. PATENT DOCUMENTS

| | | | | |
|---|---|---|---|---|
| 6,381,346 B1* | 4/2002 | Eraslan | ............. | G06K 9/00221 345/420 |
| 7,596,247 B2* | 9/2009 | Ioffe | ............. | G06K 9/6296 340/5.53 |
| 8,116,534 B2* | 2/2012 | Nishiyama | ............. | G06K 9/00255 382/103 |
| 8,199,979 B2* | 6/2012 | Steinberg | ............. | G06F 17/30247 340/5.53 |
| 8,331,616 B2* | 12/2012 | Sabe | ............. | G06K 9/00248 382/103 |
| 8,848,975 B2* | 9/2014 | Tell | ............. | G06K 9/00208 382/103 |
| 9,042,599 B2* | 5/2015 | Du | ............. | G06K 9/00993 382/103 |

(Continued)

OTHER PUBLICATIONS

Peng et al. "RASL: Robust Alignment by Sparse and Low-rank Decomposition for Linearly Correlated Images" Computer Vision and Pattern Recognition (CVPR) 2012 IEEE Conference on, pp. 1-8.*
Ayazoglu et al. "Fast algorithms for structured robust principal component analysis" Computer Vision and Pattern Recognition (CVPR) 2012 IEEE Conference pp. 1704-1711.*
Cao et al. "Face Alignment by Explicit Shape Regression" International Journal of Computer Vision Springer Science (Dec. 2012) pp. 1-14.*

(Continued)

*Primary Examiner* — Mia M Thomas
(74) *Attorney, Agent, or Firm* — Christopher McLane; Maeve M. Carpenter

(57) ABSTRACT

In an approach to face recognition in an image, one or more computer processors receive an image that includes at least one face and one or more face parts. The one or more computer processors detect the one or more face parts in the image with a face component model. The one or more computer processors cluster the detected one or more face parts with one or more stored images. The one or more computer processors extract, from the clustered images, one or more face descriptors. The one or more computer processors determine a recognition score of the at least one face, based, at least in part, on the extracted one or more face descriptors.

17 Claims, 5 Drawing Sheets

(56) References Cited

U.S. PATENT DOCUMENTS

| | | | | |
|---|---|---|---|---|
| 9,210,313 | B1* | 12/2015 | Svendsen | G06F 17/30244 |
| 2011/0293189 | A1* | 12/2011 | Sun | G06K 9/6247 |
| | | | | 382/195 |
| 2013/0259310 | A1* | 10/2013 | Tsukamoto | G06K 9/00362 |
| | | | | 382/103 |
| 2013/0266193 | A1* | 10/2013 | Tiwari | G06K 9/00771 |
| | | | | 382/115 |
| 2014/0112541 | A1* | 4/2014 | Golan | G06K 9/4609 |
| | | | | 382/103 |
| 2014/0270482 | A1* | 9/2014 | Chakraborty | G06K 9/00221 |
| | | | | 382/154 |
| 2014/0328509 | A1* | 11/2014 | Guissin | G06T 5/002 |
| | | | | 382/100 |
| 2015/0091900 | A1* | 4/2015 | Yang | G06T 5/006 |
| | | | | 345/419 |
| 2015/0110349 | A1* | 4/2015 | Feng | G06K 9/00234 |
| | | | | 382/103 |
| 2015/0169938 | A1* | 6/2015 | Yao | G06K 9/00261 |
| | | | | 382/103 |
| 2015/0317511 | A1* | 11/2015 | Li | G06K 9/00288 |
| | | | | 382/118 |
| 2016/0140146 | A1* | 5/2016 | Wexler | G06F 17/30253 |
| | | | | 707/741 |
| 2016/0292494 | A1* | 10/2016 | Ganong | G06K 9/00288 |

OTHER PUBLICATIONS

Ding et al., "Continuous Pose Normalization for Pose-Robust Face Recognition", IEEE Signal Processing Letters, vol. 19, No. 11, Nov. 2012, pp. 721-724.

Farag, "Face recognition in the wild", University of Louisville, ThinkIR: The University of Louisville's Institutional Repository, Electronic Theses and Dissertations, Dec. 2013, 123 pages.

Felzenszwalb et al., "Object Detection with Discriminatively Trained Part-Based Models", IEEE Transactions on Pattern Analysis and Machine Intelligence, vol. 32, No. 9, Sep. 2010, pp. 1627-1645.

Mostafa et al., "Dynamic Weighting of Facial Features for Automatic Pose-Invariant Face Recognition", 2012 Ninth conference on Computer and Robot Vision, pp. 411-416, © 2012 IEEE.

Mostafa et al., "Pose Invariant Approach for Face Recognition at Distance", ECCV 2012, Part VI, LNCS 7577, pp. 15-28, © Springer-Verlag Berlin Heidelberg 2012.

El Shafey et al., "A Scalable Formulation of Probabilistic Linear Discriminant Analysis: Applied to Face Recognition", IEEE Transactions on Pattern Analysis and Machine Intelligence, vol. 35, Issue: 7, Jul. 2013, pp. 1788-1794 (Supplemental pp. 1-3).

Yan et al., "The Fastest Deformable Part Model for Object Detection", 2014 IEEE Conference on Computer Vision and Pattern Recognition, Jun. 24-28, 2014, pp. 2497-2504.

* cited by examiner

FACE DETECTION, REPRESENTATION, AND RECOGNITION

BACKGROUND OF THE INVENTION

The present invention relates generally to the field of computer based image analysis and recognition, and more particularly to robust face detection, representation, and recognition.

Face recognition is an increasingly important application of computer vision, particularly in areas such as security. However, accurate face recognition is often difficult due to the fact that a person's face can look very different depending on pose, expression, illumination, and facial accessories. Face recognition has been approached with 3D model-based techniques and feature-based methods. The essential feature of every face recognition system is the similarity measure—where faces are considered similar if they belong to the same individual. A similarity measure is a real-valued function that quantifies the similarity between two objects. Typically such measures are in some sense the inverse of distance metrics: they take on large values for similar objects and either zero or a negative value for dissimilar objects. The similarity measure can be used to verify that two face images belong to the same person, or to classify novel images by determining to which of the given faces a new example is most similar.

A face recognition system generally involves a face detection process for detecting the position and size of a face image included in an input image, a face parts detection process for detecting the positions of principal face parts from the detected face image, and a face identification process that identifies the face image (i.e., the person) by checking an image obtained by correcting the position and rotation of the face image based on the positions of the face parts against a registered image. Face detection is concerned with the problem of locating regions within a digital image or video sequence, which have a high probability of representing a human face. Face detection includes a process of determining whether a human face is present in an input image, and may include determining a position and/or other features, properties, parameters, or values of parameters of the face within the input image.

Face recognition technology has achieved tremendous advancements in the last decade. However, many current automated tools perform best on well-posed, frontal facial photos taken for identification purposes. These tools may not be able to handle the sheer volume of possibly relevant videos and photographs captured in unconstrained environments. In such environments, factors like pose, illumination, partial occlusion, and varying facial expressions present a difficult challenge, even for state of the art face recognition systems.

SUMMARY

Aspects of the present invention provide an approach for face recognition in an image. A first aspect of the present invention discloses a method including one or more computer processors receiving an image that includes at least one face and one or more face parts. The one or more computer processors detect the one or more face parts in the image with a face component model. The one or more computer processors cluster the detected one or more face parts with one or more stored images. The one or more computer processors extract, from the clustered images, one or more face descriptors. The one or more computer processors determine a recognition score of the at least one face, based, at least in part, on the extracted one or more face descriptors. The approach is advantageous because the face component model improves the accuracy and detection rate of state-of-the-art face detection in unconstrained environments and under partial occlusion.

A second aspect of the present invention discloses a computer program product including one or more computer readable storage devices and program instructions stored on the one or more computer readable storage devices. The stored program instructions include program instructions to receive an image that includes at least one face and one or more face parts. The stored program instructions include program instructions to detect the one or more face parts in the image with a face component model. The stored program instructions include program instructions to cluster the detected one or more face parts with one or more stored images. The stored program instructions include program instructions to extract, from the clustered images, one or more face descriptors. The stored program instructions include program instructions to determine a recognition score of the at least one face, based, at least in part, on the extracted one or more face descriptors.

A third aspect of the present invention discloses a computer system including one or more computer processors and one or more computer readable storage devices, wherein the program instructions are stored on the one or more computer readable storage devices for execution by at least one of the one or more computer processors. The stored program instructions include program instructions to receive an image that includes at least one face and one or more face parts. The stored program instructions include program instructions to detect the one or more face parts in the image with a face component model. The stored program instructions include program instructions to cluster the detected one or more face parts with one or more stored images. The stored program instructions include program instructions to extract, from the clustered images, one or more face descriptors. The stored program instructions include program instructions to determine a recognition score of the at least one face, based, at least in part, on the extracted one or more face descriptors.

In yet another aspect of the invention, detecting the one or more face parts with a face component model includes applying, by the one or more computer processors, a root filter to the image, initializing, by the one or more computer processors, a set of the one or more face parts, determining, by the one or more computer processors, whether a presence of one or more occluding objects is detected in the image that exceeds a threshold, and, in response to determining the presence of one or more occluding objects is detected in the image that exceeds a threshold, adding, by the one or more computer processors, the one or more occluding objects to the set of one or more face parts.

In yet another aspect of the invention, extracting, from the clustered images, one or more face descriptors further includes normalizing, by the one or more computer processors, the received image, comparing, by the one or more computer processors, the normalized image to one or more existing templates of facial features, determining, by the one or more computer processors, whether a minimum distance between the normalized image and the one or more existing templates exceeds a threshold, in response to determining the minimum distance between the normalized image and the one or more existing templates exceeds a threshold, determining, by the one or more computer processors, whether a quantity of the one or more existing templates is less than a pre-defined maximum quantity, and in response to determining the quantity of the one or more existing templates is less than a pre-defined maximum quantity, creating, by the one or more computer processors, a new template from the normalized image. An advantage of this approach is that by keeping the number of templates a fixed size, computation complexity of face matching and recognition does not increase with the number of images, but, instead, remains constant.

In yet another aspect of the invention, determining the recognition score of the at least one face further includes using, by the one or more computer processors, a trained convolution deep neural network. An advantage of this approach is that a trained convolution deep neural network can handle large-scale data with complex distribution.

DETAILED DESCRIPTION

Embodiments of the present invention recognize that efficiency can be gained in face recognition systems by implementing a face components model that can detect parts of the face instead of an entire face in an image when portions of the face in the image are difficult to detect due to full or partial occlusion, for example. Embodiments of the present invention also recognize that efficiency can be gained by implementing a fixed size face descriptor for face recognition. In addition, embodiments of the present invention recognize that efficiency can be gained by implementing a deep neural network for optimizing face feature extraction and classification. Implementation of embodiments of the invention may take a variety of forms, and exemplary implementation details are discussed subsequently with reference to the Figures.

Figure 1:
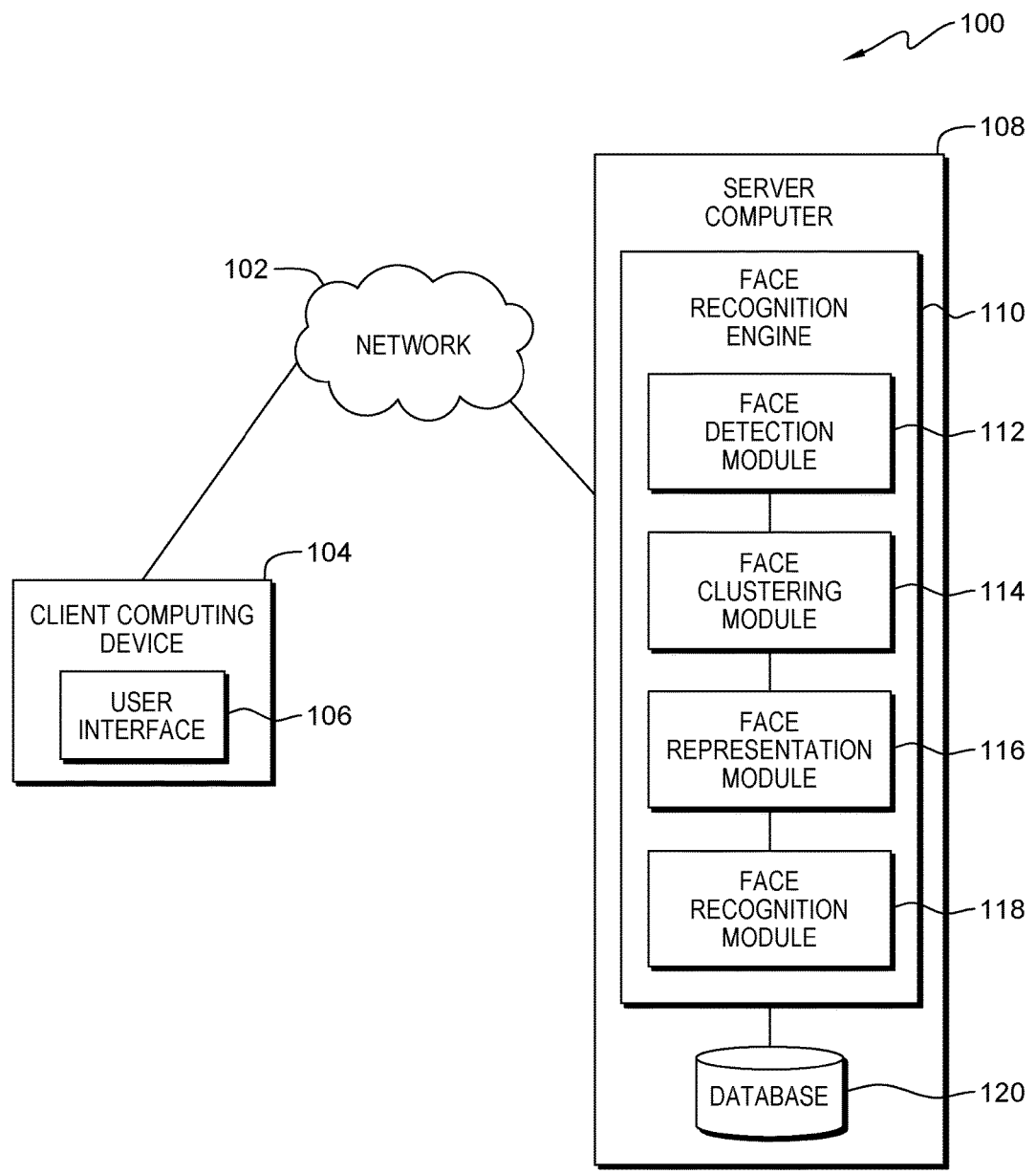
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes user interface 106. In one embodiment, client computing device 104 includes a camera for capturing images that the user may submit to server computer 108 for face detection and recognition.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to access server computer 108 for face detection and recognition processes.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes face recognition engine 110 and database 120. Server computer 108 may include internal and external hardware components, as depicted and described in further detail with respect to FIG. 5.

Face recognition engine 110 begins a face recognition process by performing face detection on images received, either for enrollment in a gallery or with a query for matching, using an approach that includes a face components model (FCM). In the FCM, face recognition engine 110 models faces as a collection of parts that include regular facial parts, such as eyes, nose, and mouth, and optional common occluding objects, including, but not limited to, sunglasses, caps, hands, and other faces. Face recognition engine 110 aligns and normalizes detected faces to a frontal view using a 3D mean shape. Face recognition engine 110 then extracts features from each face part. Face recognition engine 110 uses the extracted features to cluster the data based on feature-based similarity. During a face recognition process, face recognition engine 110 may extract a compact face descriptor (CFD) from the clustered faces to represent each subject in a gallery, where a gallery is a collection of images used for matching. The CFD includes a stack of M templates, where M is a maximum number of templates, for each face part. During a face recognition process, face recognition engine 110 extracts CFDs of query images in the same manner. In one embodiment, face recognition engine 110 computes a recognition score by calculating the distance between an extracted vector and one or more subjects, i.e., faces, in a gallery or database, using sparse similarity measure. In another embodiment, face recognition engine 110 may compute a recognition score by training a deep neural network using the extracted templates and occlusion maps. In one embodiment, occlusion maps are pre-defined within face recognition engine 110 based on observation of a large number of face images, and may be stored in database 120. Occlusion maps define an area where one or more occluding objects are expected to cover parts of a face. For example, sunglasses are expected to cover the eyes.

In the depicted embodiment, face recognition engine 110 includes four components that perform the various functions of a face recognition process, as described above: face detection module 112, face clustering module 114, face representation module 116, and face recognition module 118. In another embodiment, face recognition engine 110 is a fully integrated tool that includes the functions of the previously listed components, but the components are not individual entities. In a further embodiment, face recognition engine 110 does not use face representation module 116. In yet another embodiment, one or more of the four components may be integrated within face recognition engine 110.

Face detection module 112 includes a face component model (FCM). The FCM models a face as a collection of facial parts, for example, two eyes, one nose, and one mouth, in addition to various occluding parts, such as sunglasses, caps, hands, etc. In one embodiment, the FCM may also detect special facial characteristics, including, but not limited to, scars, tattoos, piercings, and facial hair, as optional parts for a face. The FCM detects a face and suggests visible parts for use in the rest of a face recognition process. The FCM is comprised of two components. One component handles frontal and near frontal faces, i.e., faces with two eyes visible. Another component handles profile and near profile faces, i.e., faces with only one eye visible. Face detection module 112 recovers other poses by deformations embedded in the model, which allows for different parts to change locations or positions, for example, eyes may be open or closed. Each of the two components includes a root filter that captures a global appearance of a face in an image and several parts filters that capture a texture of different parts. In one embodiment, the parts filters capture the texture of different parts at twice the spatial resolution, i.e., zoom in to the image of the face by a factor of two. Face detection module 112 calculates an overall score of an image by adding the root score of the image to the sum of the parts scores belonging to a selected set of objects. The overall score is an indication of the confidence that the detected object is a particular face part. Using the FCM approach is advantageous because the FCM approach improves the accuracy and detection rate of state-of-the-art face detection in unconstrained environments and under partial occlusion. Face detection module 112 is depicted and described in further detail with respect to FIG. 2.

Face clustering module 114 clusters similarly appearing faces into subjects by following a process of several steps. The steps include facial landmark detection, face normalization, feature extraction, and clustering. Face clustering module 114 normalizes detected faces into either a frontal or profile pose using a 3D reconstructed shape, extracts feature vectors from the normalized faces, and clusters the feature vectors using a feature-based similarity measure. Face clustering module 114 performs landmark detection, i.e., detection of various points on a face, using one of a plurality of techniques known in the art. For example, face clustering module 114 may be based on a regularized boosted classifier coupled with a mixture of complex Bingham distributions. Face clustering module 114 may detect landmarks using an energy functional representation, and reduce false positives by regularizing a boosted classifier with a variance normalization factor. Face clustering module 114 may also model an appearance around each landmark using Haar-like features, as would be recognized by one skilled in the art.

Pose normalization is important in face recognition processes to overcome differences between images in a gallery and query images (to be matched to gallery images), for example head tilt or a direction the head is facing. Face clustering module 114 normalizes poses using one of a plurality of techniques known in the art. For example, in one embodiment, face clustering module 114 detects cropped faces based on detected landmarks and warps the faces to either the corresponding frontal or profile view based on the pose of the input image. Continuing the example, face clustering module 114 estimates a pose from the detected landmarks, uses the estimated pose to estimate a projection matrix to align a 3D mean shape to the same pose of the input face, and maps a texture from the 2D domain to color the 3D face vertex. Face clustering module 114 then generates one or more faces in either a frontal view or profile view based on the pose angle of the input image.

After pose normalization, face clustering module 114 extracts one or more facial feature templates from the normalized faces. The facial feature template is a combination of features extracted from different facial components. Face clustering module 114 represents each facial component by concatenating descriptors around a number of landmarks that belong to the component at different image resolutions. For example, face clustering module 114 may represent a left eye by five landmarks, i.e., points: two corners, a center, a center upper, and a center lower. In one embodiment, the representation of each part may contain redundant information, however an over-completed descriptor may improve accuracy. In a preferred embodiment, face clustering module 114 utilizes compact face descriptors (CFD), as will be described with respect to face representation module 116. In another embodiment, face clustering module 114 builds descriptors using one of a plurality of techniques known in the art. For example, in one embodiment, face clustering module 114 may build a descriptor using a combination of high-dimension local binary pattern and a histogram of oriented gradients (HOG) since the techniques include a tradeoff between computational complexity and accuracy. In the example, face clustering module 114 performs a dimensionality reduction on the facial feature templates using principle component analysis (PCA) and probabilistic linear discriminative analysis (PLDA). After extracting the facial feature templates, face clustering module 114 clusters the facial feature templates obtained from different faces into subjects using one of a plurality of clustering approaches known in the art. For example, in one embodiment, face clustering module 114 may cluster the templates using a fuzzy C-means clustering algorithm.

In an embodiment where face recognition engine 110 includes face representation module 116, face representation module 116 creates a fixed size compact face descriptor (CFD) for representing subject faces. A CFD consists of a stack of M templates for each subject (at frontal and profile view), where M is a maximum number of templates, and corresponding features extracted from each face part. The CFD converges to the basis for representing the subject space at frontal and profile view independently when the enrolled data covers the extreme point in the subject space at different illumination conditions, expressions, and occlusion. An advantage of the CFD is that the CFD remains a fixed size, independent of the number of enrolled images and videos per subject, thus the computation complexity of face matching and recognition does not increase with the number of images, but, instead, remains constant. By using the CFD, face representation module 116 makes use of all imagery, which is advantageous over known solutions because face representation module 116 does not rely on a single best frame approach, and dynamically updates the CFD using newly enrolled images. In addition, by using the M-template approach, the CFD is more robust to variations of age, expression, face marks, and extreme illumination that cannot be corrected using common illumination normalization techniques. Another advantage of using the CFD is that the CFD can handle different problems, such as illumination, expression, age, etc., that are challenging for known approaches. For example, a difference of Gaussian approach may be used to preprocess illumination variation before feature extraction, but the approach fails in handling the full spectrum of illumination variation. A CFD, however, uses multiple images for the same subject under different expressions to handle different facial expressions. Face representation module 116 is depicted and described in further detail with respect to FIG. 3.

Face recognition module 118 uses inputs extracted and created by face detection module 112, face clustering module 114, and face representation module 116 to perform face recognition on an image presented by a user, via user interface 106. Face recognition module 118 aligns and normalizes test media, i.e., query images and video frames, to a frontal or profile view. Face recognition module 118 extracts features from each visible face part. Then face recognition module 118 computes recognition score, i.e., a distance between the extracted vector and each subject in database 120, using sparse similarity measure and performs a matching process. In a preferred embodiment, face recognition module 118 determines the recognition score in the matching process by using a trained convolution deep neural network, as is known to one skilled in the art, to handle large-scale data with a complex distribution and to optimize face feature extraction and classification. In the embodiment, the convolution deep neural network may consist of N layers of convolution, where each layer is followed by maximum pooling, and the last layer is a fully connected layer. The input to the convolution deep neural network includes facial feature templates and occlusion maps detected by face detection module 112 using the FCM approach. An advantage of using the described convolution deep neural network architecture is that by using the feature combination, face recognition module 118 may achieve robust face recognition under occlusion as well as incorporating unusual characteristics in the recognition. In addition, using the described convolution deep neural network enables face recognition module 118 to handle large-scale data with complex distribution.

In another embodiment, face recognition module 118 may perform the matching process by comparing the input image to each image in database 120 one by one. Although functional, this method will likely take a long time, depending on the number of images in database 120. In another embodiment, face recognition module 118 may perform the matching process by using a known 1-N matching scheme. For example, face recognition module 118 may apply a nested cascade classifier to improve matching complexity and speed. Face recognition module 118 may divide template features into several nested stages from coarse to fine. If face recognition module 118 determines the resulting similarity score is smaller than a threshold of a current stage, then face recognition module 118 interrupts the matching process. Since the probability of two facial feature templates belonging to different subjects is high, face recognition module 118 rejects most of the matching pairs in the early stages of the cascade, which may improve the matching speed significantly.

In a further embodiment, face recognition module 118 may perform the matching process by using an indexing approach based on geometric hashing which has a constant time O(1) retrieval performance. In the embodiment, face recognition module 118 transforms CFDs to a lower dimensional index and records them in a hash table as a single entry associated with a particular ID. Face recognition module 118 converts the input image to a similar set of indices, retrieves corresponding IDs from the hash table, and uses a voting scheme to resolve the likely ID, thus enabling retrieval even if the input or gallery models are only partially defined.

Database 120 is a repository for images used by face recognition engine 110, also known as a gallery. In the depicted embodiment, database 120 resides on server computer 108. In another embodiment, database 120 may reside elsewhere within distributed data processing environment 100 provided face recognition engine 110 has access to database 120. A database is an organized collection of data. Database 120 can be implemented with any type of storage device capable of storing data and configuration files that can be accessed and utilized by server computer 108, such as a database server, a hard disk drive, or a flash memory. Database 120 stores images of a plurality of subjects, i.e., faces, used to train face recognition engine 110 as well as query images submitted to face recognition engine 110, via user interface 106, for matching purposes. Database 120 may also store templates associated with one or more CFDs.

Figure 2:
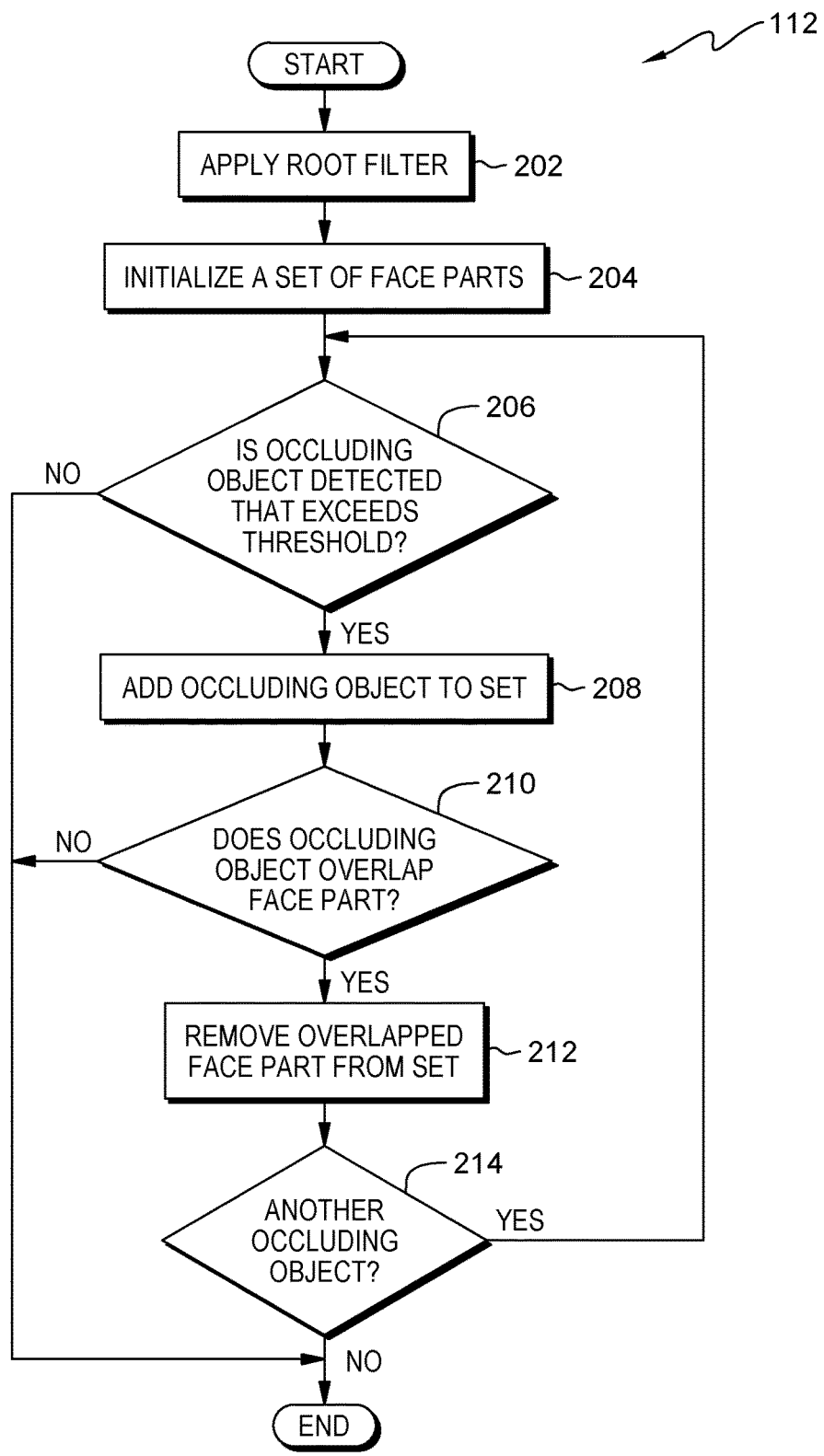
FIG. 2 is a flowchart depicting operational steps of a face detection module, in a face recognition engine, on a server computer within the distributed data processing environment of FIG. 1, for detecting face parts in an image, in accordance with an embodiment of the present invention.

FIG. 2 is a flowchart depicting operational steps of face detection module 112, on server computer 108 within distributed data processing environment 100 of FIG. 1, for detecting face parts in an image, in accordance with an embodiment of the present invention.

Face detection module 112 applies a root filter (step 202). When face detection module 112 receives an image submitted by a user of client computing device 104, via user interface 106, for either a query or enrollment in a gallery, application of the root filter to a face in an image captures the global appearance of the face which includes face parts and occluding objects. In a preferred embodiment, face detection module 112 uses an FCM to apply the root filter.

Face detection module 112 initializes a set of face parts (step 204). Face detection module 112 creates a set of face parts, such as two eyes, a nose and a mouth. For example, face detection module 112 may create a set S that includes $P_1$ as a left eye, $P_2$ as a right eye, $P_3$ as a nose, and $P_4$ as a mouth. In one embodiment, face detection module initializes the set of face parts based on expected locations of face parts in a global appearance or position of a face, i.e., two eyes, a nose and a mouth are expected in a frontal position face image, whether or not occluding objects are present in the image. Face detection module 112 selects the face parts by comparing different subtypes of each part and selecting the best match. A subtype is a different template for each face part. For example, subtypes of an eye can be the eye open or the eye closed. Therefore subtypes may be included for each face part within a gallery.

Face detection module 112 determines whether an occluding object is detected that exceeds a pre-defined threshold (decision block 206). Face detection module 112 looks for additional objects in the image that may occlude the face parts. Examples of occluding objects include, but are not limited to, sunglasses, caps, hands, and other faces. In one embodiment, the pre-defined threshold is a percentage of pixels in the image. Exceeding the pre-defined threshold indicates the object's presence in the image. If face detection module 112 determines the image includes an occluding object that exceeds the pre-defined threshold ("yes" branch, decision block 206), then face detection module 112 adds the occluding object to the set of face parts (step 208). For example, if face detection module 112 detects an occluding object, such as sunglasses, in the image, then face detection module 112 adds the sunglasses as object $P_5$ to set S.

Face detection module 112 determines whether the occluding object overlaps a face part (decision block 210). Face detection module 112 compares the occluding object to a corresponding face part according to one or more occlusion maps. In one embodiment, face detection module 112 determines whether a pre-defined percentage of the face part is missing from the image. For example, face detection module 112 may determine that at least 75 percent of the left eye is missing. If face detection module 112 determines the occluding object overlaps a face part ("yes" branch, decision block 210), then face detection module 112 removes the overlapped face part from the set (step 212). Face detection module 112 computes a score for the detection of a possible occluding object and then compares the score of the occluding object to a score of the overlapped object and keeps the object with the highest score in the set. In one embodiment, the score is a probability of detection, i.e., a confidence level. The confidence level may be measured by how close the object under consideration is to other subtypes in the gallery. For example, face detection module 112 computes a confidence that a detected object is a left eye. If an occluding object, such as sunglasses, has a higher score than an overlapped object, such as a left eye, then face detection module 112 keeps the sunglasses in the set of parts and removes the left eye from the set of parts. In another example, if an occluding object, such as a cap, has a lower score than an overlapped object, such as a left eye, then face detection module 112 keeps the left eye in the set of parts and removes the cap from the set of parts.

Face detection module 112 determines whether another occluding object is detected in the image (decision block 214). If face detection module 112 determines another occluding object is detected in the image ("yes" branch, decision block 214), then face detection module 112 returns to decision block 206.

If face detection module 112 determines the image does not include an occluding object that exceeds the pre-defined threshold ("no" branch, decision block 206), or if face detection module 112 determines the occluding object does not overlap a face part ("no" branch, decision block 210), or if face detection module 112 determines another occluding object is not detected in the image ("no" branch, decision block 214), then face detection module 112 completes the face detection process on the received image and ends. In one embodiment, the FCM performs all the steps described with respect to FIG. 2. Using the FCM is advantageous because the FCM improves the performance, e.g., the speed and accuracy, of face recognition engine 110, especially with images that include one or more occluding objects.

Figure 3:
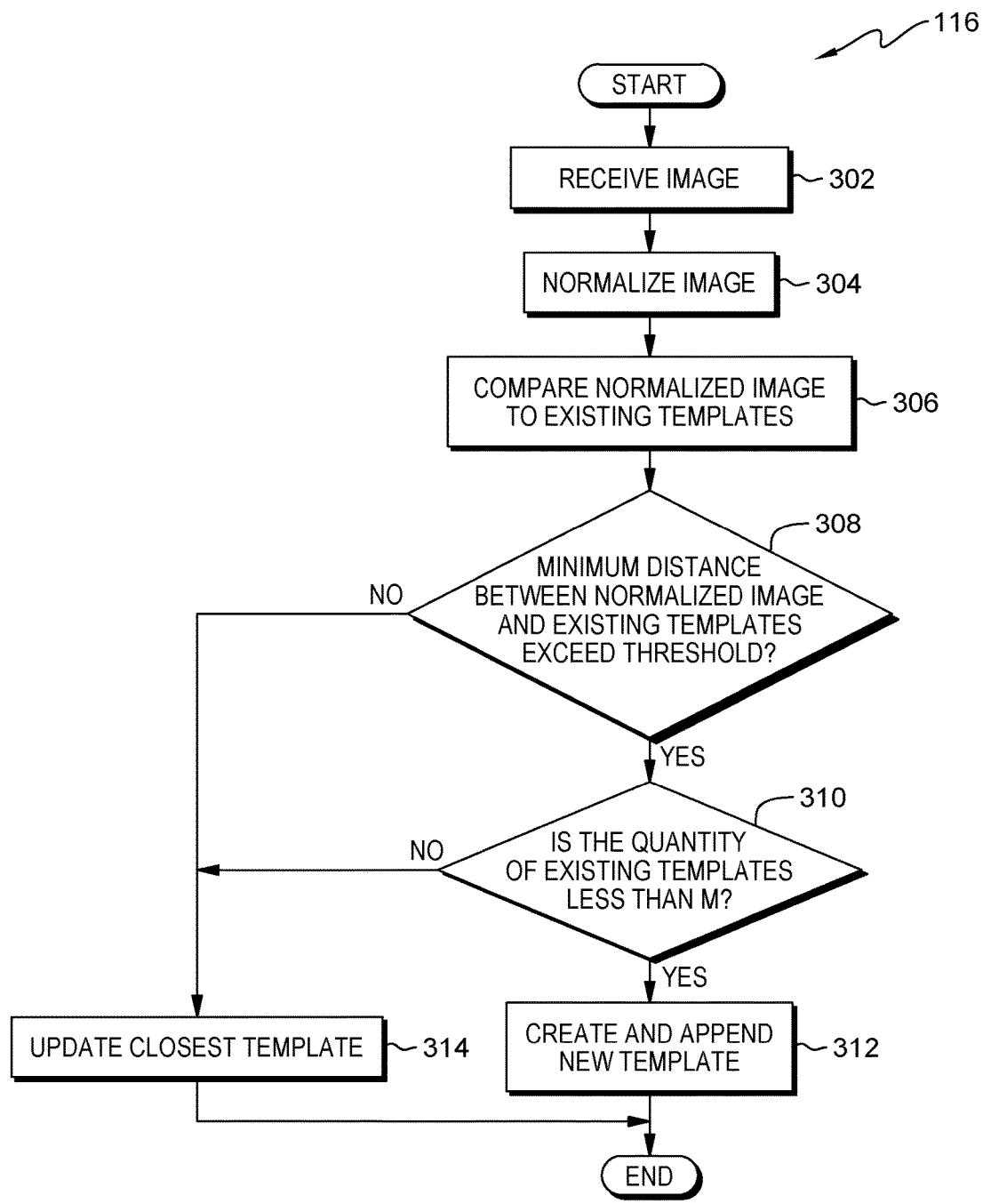
FIG. 3 is a flowchart depicting operational steps of a face representation module, in the face recognition engine, on the server computer within the distributed data processing environment of FIG. 1, in accordance with an embodiment of the present invention.

FIG. 3 illustrates operational steps of face representation module 116, in face recognition engine 110, on server computer 108 within distributed data processing environment 100 of FIG. 1, in accordance with an embodiment of the present invention.

Face representation module 116 receives an image (step 302). When a user of client computing device 104 enrolls a new image to the gallery, via user interface 106, face representation module 116 receives the image. In one embodiment, face detection module 112 also receives an image when a user of client computing device 104 submits an image, via user interface 106, as a query. In one embodiment, the received image is the same image referenced in FIG. 2.

Face representation module 116 normalizes the received image (step 304). In one embodiment, face representation module 116 normalizes the image using one of a plurality of techniques known in the art, as discussed with respect to face clustering module 114 in FIG. 1.

Face representation module 116 compares the normalized image to existing templates (step 306). Once face representation module 116 normalizes the image, face representation module 116 compares the normalized image to facial feature templates included in a CFD, and stored in database 120, for the same subject.

Face representation module 116 determines whether a minimum distance between features in the normalized image and features in the existing templates exceeds a threshold (decision block 308). The distance between the normalized image and existing templates is a measure of similarity. In one embodiment, face representation module 116 uses adaptive learning to choose the threshold by training an algorithm on similar and different faces to discover the threshold dynamically. In one embodiment, face representation module 116 measures the distance using a simple Euclidean distance, as would be recognized by one skilled in the art, to compute the distance between two vectors. In another embodiment, face representation module 116 measures the distance by training a Siamese neural network, as would be recognized by one skilled in the art, to compute the threshold and distance for similarity measurement. If face representation module 116 determines the minimum distance between the normalized image and the existing templates exceeds a threshold ("yes" branch, decision block 308), then face representation module 116 determines whether the quantity of existing templates is less than M (decision block 310). M is a maximum number of templates allowed in the stack of the compact face descriptor (CFD), thus keeping the CFD at a fixed size. In one embodiment, the user of client computing device 104 defines a value of M. In another embodiment, a system administrator may define a value of M.

If face representation module 116 determines the quantity of existing templates is less than M ("yes" branch, decision block 310), then face representation module 116 creates and appends a new template (step 312). If face representation module 116 determines the CFD includes less than the maximum number of templates, then face representation module 116 creates a new template from the normalized image and appends the new template to the existing templates in database 120.

If face representation module 116 determines the minimum distance between the normalized image and the existing templates does not exceed a threshold ("no" branch, decision block 308), or if face representation module 116 determines the quantity of existing templates is not less than M ("no" branch, decision block 310), then face representation module 116 updates the closest template (step 314). Face representation module 116 determines a matching score for each of the existing templates as compared to the normalized image. Face representation module 116 determines which of the existing templates has the highest matching score or similarity measurement, i.e., the minimum distance from the normalized image, and then updates the most similar template. Face representation module 116 regenerates features extracted from one or more facial parts to update the template in database 120.

Figure 4:
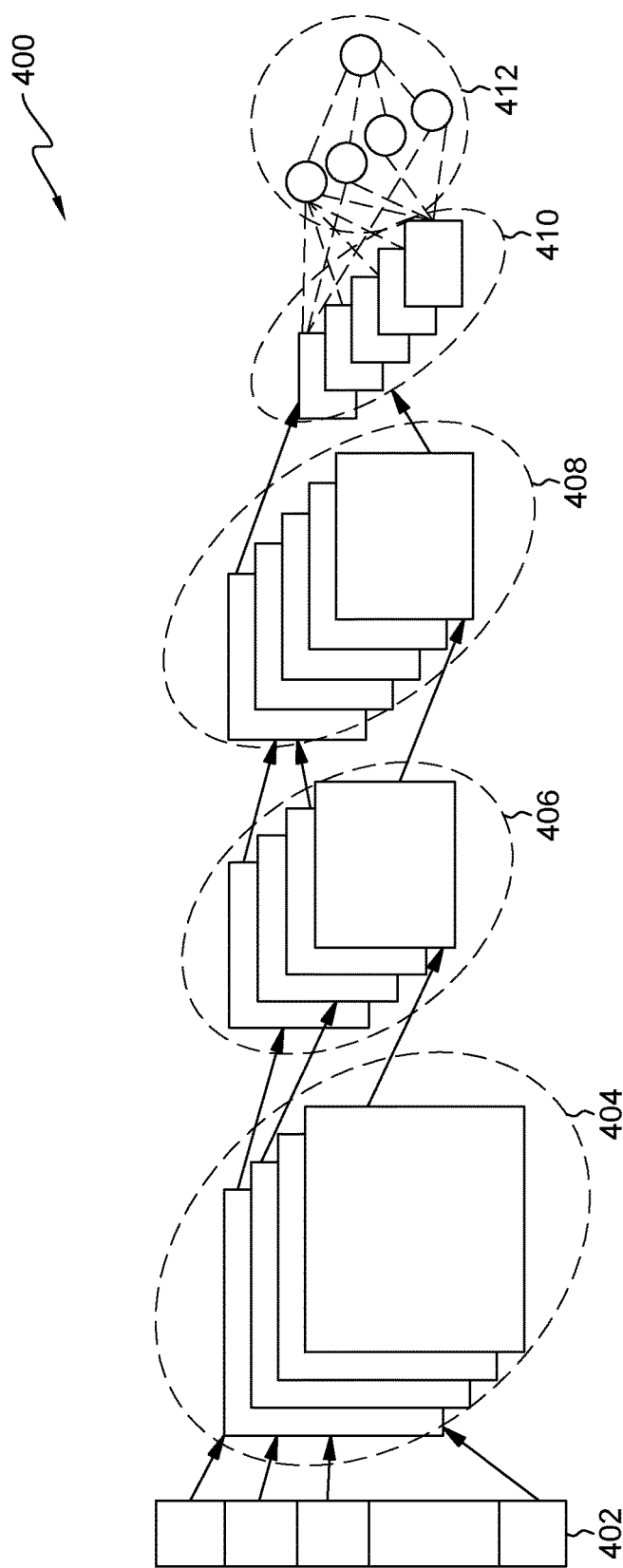
FIG. 4 illustrates an example of a deep neural network used by a face recognition module in the face recognition engine, on the server computer within the distributed data processing environment of FIG. 1, in accordance with an embodiment of the present invention.

FIG. 4 illustrates an example of deep neural network 400 used by face recognition module 118 within distributed data processing environment 100 of FIG. 1, in accordance with an embodiment of the present invention.

In the depicted embodiment, deep neural network 400 is a convolution neural network (CNN), as would be recognized by one skilled in the art. Deep neural network 400 includes convolution layer 404, sub-sampling layer 406, convolution layer 408, sub-sampling layer 410, and fully connected multilayer perceptron 412. Convolution layers 404 and 408 consist of a rectangular grid of neurons, and require that the previous layer also be a rectangular grid of neurons. Each neuron takes inputs from a rectangular section of the previous layer; the weights for the input rectangular section are the same for each neuron in the convolution layer. Thus, a convolution layer is an image convolution of the previous layer, where the weights specify the convolution filter. In addition, there may be several grids in each convolution layer; each grid takes inputs from the grids in the previous layer, using potentially different filters.

Sub-sampling layers 406 and 410 are examples of pooling layers. A pooling layer takes rectangular blocks from the convolution layer and subsamples the blocks to produce a single output from that block. In the depicted embodiment, sub-sampling layers 406 and 410 are max-pooling layers, i.e., sub-sampling layers 406 and 410 take the maximum of the block they are pooling. In another embodiment, deep neural network 400 may perform pooling by instructing sub-sampling layers 406 and 410 to take the average of the block. In a further embodiment, deep neural network 400 may perform pooling by instructing sub-sampling layers 406 and 410 to use a learned linear combination of the neurons in the block.

Fully connected multilayer perceptron 412 performs high-level reasoning in deep neural network 400. As would be recognized by one skilled in the art, a multilayer perceptron (MLP) is a feedforward artificial neural network model that maps sets of input data onto a set of appropriate outputs. Fully connected multilayer perceptron 412 is not spatially located.

CFD 402 represents a stack of M facial feature templates, where, in the depicted simplified example, M is five. CFD 402 is the input to deep neural network 400. In one embodiment, one or more occlusion maps may also be input to deep neural network 400. Convolution layer 404 consists of a rectangular grid of neurons. Convolution layer 404 performs image convolution, i.e., filtering, on each of the facial feature templates in CFD 402 to extract a face representation. The right-pointing arrows between the depicted layers represent filter weights or parameters that deep neural network 400 trains. Deep neural network 400 adjusts the weights of the filter during training. The output of convolution layer 404 is a filtered image. Sub-sampling layer 406 divides the image into small rectangular blocks. The size of each block can vary. In one embodiment, deep neural network 400 uses a 3×3 pixel block size. In other embodiments, deep neural network 400 may user other block sizes. Sub-sampling layer 406 subsamples each block to produce a single output (maximum value) from that block. For example, if the input to sub-sampling layer 406 is 81×81 pixels, and the block size is 3×3 pixels, then the output of sub-sampling layer 406 is an image of 27×27 pixels.

Deep neural network 400 may use multiple concatenated convolution and sub-sampling layers to improve the feature selection task. In the depicted embodiment, deep neural network 400 uses two of each type of layer. For the recognition task, deep neural network 400 performs high-level reasoning via fully connected multilayer perceptron 412. Fully connected multilayer perceptron 412 takes each neuron in the previous layer (whether the previous layer is fully connected, pooling, or convolution) and connects each neuron to every single neuron within fully connected multilayer perceptron 412.

Figure 5:
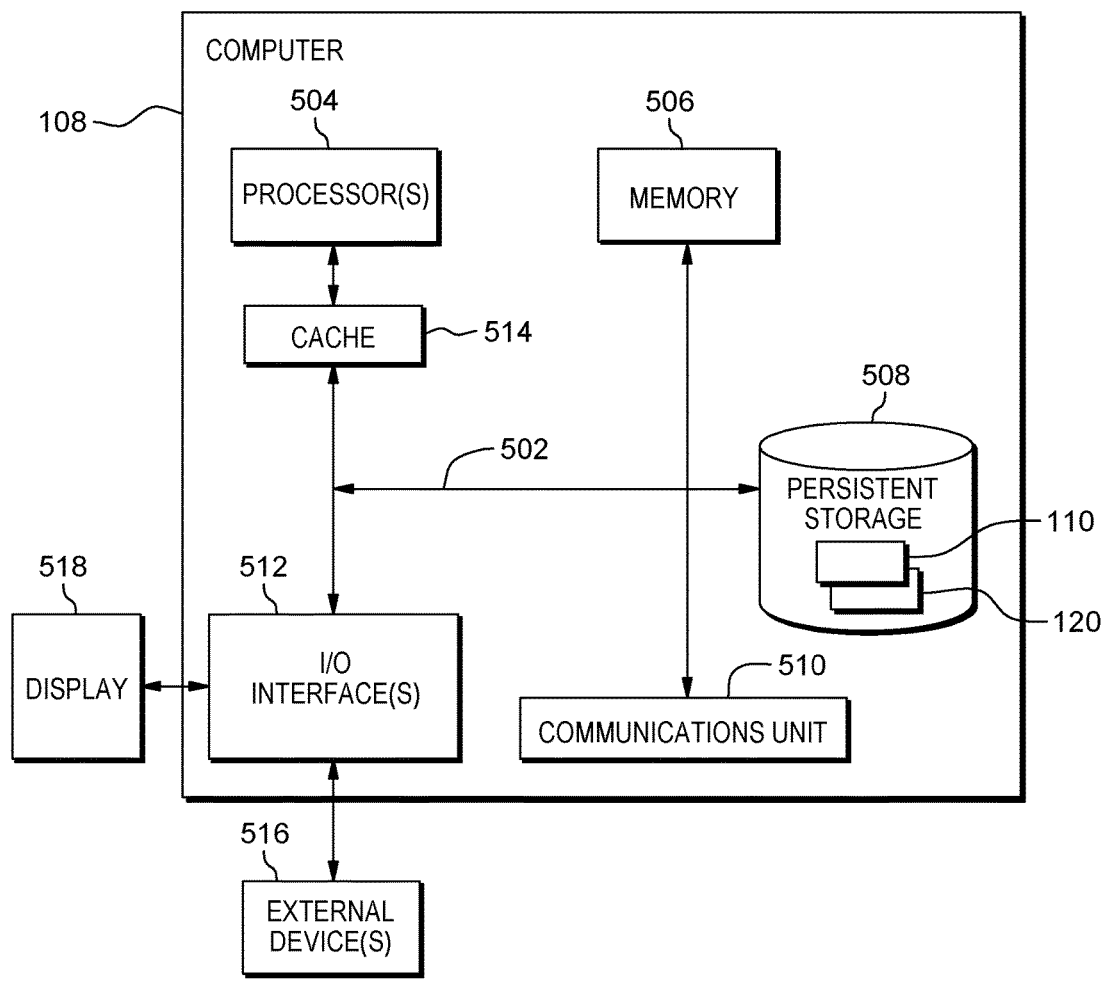
FIG. 5 depicts a block diagram of components of the server computer executing the face recognition engine within the distributed data processing environment of FIG. 1, in accordance with an embodiment of the present invention.

FIG. 5 depicts a block diagram of components of server computer 108 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 108 can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., face recognition engine 110 and database 120 are stored in persistent storage 508 for execution and/or access by one or more of the respective processor(s) 504 of server computer 108 via memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client computing device 104. In these examples, communications unit 510 includes one or more network interface cards. Communications unit 510 may provide communications through the use of either or both physical and wireless communications links. Face recognition engine 110 and database 120 may be downloaded to persistent storage 508 of server computer 108 through communications unit 510.

I/O interface(s) 512 allows for input and output of data with other devices that may be connected to server computer 108. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention, e.g., face recognition engine 110 and database 120 on server computer 108, can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for face recognition in an image, the method comprising:
   receiving, by one or more computer processors, an image that includes at least one face and one or more face parts;
   normalizing, by the one or more computer processors, the received image;
   comparing, by the one or more computer processors, the normalized image to one or more existing templates of facial features in a first a face descriptor of a plurality of face descriptors;
   determining, by the one or more computer processors, whether a minimum distance between the normalized image and the one or more existing templates exceeds a threshold;
   responsive to determining the minimum distance between the normalized image and the one or more existing templates exceeds a threshold, determining, by the one or more computer processors, whether a quantity of the one or more existing templates is less than a pre-defined maximum quantity;
   responsive to determining the quantity of the one or more existing templates is less than a pre-defined maximum quantity, creating, by the one or more computer processors, a new template from the normalized image, wherein the new template is appended to the one or more existing templates in the first face descriptor;
   detecting, by the one or more computer processors, the one or more face parts in the image with a face component model;
   clustering, by the one or more computer processors, the detected one or more face parts with one or more stored images;
   extracting, by the one or more computer processors, from the clustered images, one or more face descriptors of the plurality of face descriptors; and
   determining, by the one or more computer processors, a recognition score of the at least one face, based, at least in part, on the extracted one or more face descriptors.

2. The method of claim 1, wherein detecting the one or more face parts with a face component model further comprises:
   applying, by the one or more computer processors, a root filter to the image;
   initializing, by the one or more computer processors, a set of the one or more face parts;
   determining, by the one or more computer processors, whether a presence of one or more occluding objects is detected in the image that exceeds a threshold; and
   responsive to determining the presence of one or more occluding objects is detected in the image that exceeds a threshold, adding, by the one or more computer processors, the one or more occluding objects to the set of one or more face parts.

3. The method of claim 2, further comprising:
   determining, by the one or more computer processors, whether the one or more occluding objects overlap one or more face parts in the image; and
   responsive to determining the one or more occluding objects overlap at least one of the one or more face parts in the image, removing, by the one or more computer processors, the one or more overlapped face parts from the set the one or more of face parts.

4. The method of claim 1, further comprising, responsive to determining the quantity of the one or more existing templates is not less than a pre-defined maximum quantity, updating, by the one or more computer processors, a first template of the one or more existing templates, wherein the first template most closely matches the normalized image.

5. The method of claim 1, wherein determining the recognition score of the at least one face further comprises using, by the one or more computer processors, a trained convolution deep neural network.

6. The method of claim 5, wherein the trained convolution deep neural network uses as input at least one of the one or more face descriptors of the plurality of face descriptors or one or more occlusion maps.

7. The method of claim 1, wherein the received image includes at least one object that occludes at least one of the one or more face parts.

8. A computer program product for face recognition in an image, the computer program product comprising:
one or more computer readable storage devices and program instructions stored on the one or more computer readable storage devices, the stored program instructions comprising:
program instructions to receive an image that includes at least one face and one or more face parts;
program instructions to normalize the received image;
program instructions to compare the normalized image to one or more existing templates of facial features in a first a face descriptor of a plurality of face descriptors;
program instructions to determine whether a minimum distance between the normalized image and the one or more existing templates exceeds a threshold;
responsive to determining the minimum distance between the normalized image and the one or more existing templates exceeds a threshold, program instructions to determine whether a quantity of the one or more existing templates is less than a pre-defined maximum quantity;
responsive to determining the quantity of the one or more existing templates is less than a pre-defined maximum quantity, program instructions to create a new template from the normalized image, wherein the new template is appended to the one or more existing templates in the first face descriptor;
program instructions to detect the one or more face parts in the image with a face component model;
program instructions to cluster the detected one or more face parts with one or more stored images;
program instructions to extract, from the clustered images, one or more face descriptors of the plurality of face descriptors; and
program instructions to determine a recognition score of the at least one face, based, at least in part, on the extracted one or more face descriptors.

9. The computer program product of claim 8, wherein the program instructions to detect the one or more face parts with a face component model comprise:
program instructions to apply a root filter to the image;
program instructions to initialize a set of the one or more face parts;
program instructions to determine whether a presence of one or more occluding objects is detected in the image that exceeds a threshold; and
responsive to determining the presence of one or more occluding objects is detected in the image that exceeds a threshold, program instructions to add the one or more occluding objects to the set of one or more face parts.

10. The computer program product of claim 9, the stored program instructions further comprising:
program instructions to determine whether the one or more occluding objects overlap one or more face parts in the image; and
responsive to determining the one or more occluding objects overlap at least one of the one or more face parts in the image, program instructions to remove the one or more overlapped face parts from the set the one or more of face parts.

11. The computer program product of claim 8, the stored program instructions further comprising, responsive to determining the quantity of the one or more existing templates is not less than a pre-defined maximum quantity, program instructions to update a first template of the one or more existing templates, wherein the first template most closely matches the normalized image.

12. The computer program product of claim 8, wherein the program instructions to determine the recognition score of the at least one face comprise program instructions to use a trained convolution deep neural network.

13. A computer system for face recognition in an image, the computer system comprising:
one or more computer processors;
one or more computer readable storage devices;
program instructions stored on the one or more computer readable storage devices for execution by at least one of the one or more computer processors, the stored program instructions comprising:
program instructions to receive an image that includes at least one face and one or more face parts;
program instructions to normalize the received image;
program instructions to compare the normalized image to one or more existing templates of facial features in a first a face descriptor of a plurality of face descriptors;
program instructions to determine whether a minimum distance between the normalized image and the one or more existing templates exceeds a threshold;
responsive to determining the minimum distance between the normalized image and the one or more existing templates exceeds a threshold, program instructions to determine whether a quantity of the one or more existing templates is less than a pre-defined maximum quantity;
responsive to determining the quantity of the one or more existing templates is less than a pre-defined maximum quantity, program instructions to create a new template from the normalized image, wherein the new template is appended to the one or more existing templates in the first face descriptor;
program instructions to detect the one or more face parts in the image with a face component model;
program instructions to cluster the detected one or more face parts with one or more stored images;
program instructions to extract, from the clustered images, one or more face descriptors of the plurality of face descriptors; and
program instructions to determine a recognition score of the at least one face, based, at least in part, on the extracted one or more face descriptors.

14. The computer system of claim 13, wherein the program instructions to detect the one or more face parts with a face component model comprise:
program instructions to apply a root filter to the image;

program instructions to initialize a set of the one or more face parts;

program instructions to determine whether a presence of one or more occluding objects is detected in the image that exceeds a threshold; and responsive to determining the presence of one or more occluding objects is detected in the image that exceeds a threshold, program instructions to add the one or more occluding objects to the set of one or more face parts.

15. The computer system of claim 14, the stored program instructions further comprising:

program instructions to determine whether the one or more occluding objects overlap one or more face parts in the image; and responsive to determining the one or more occluding objects overlap at least one of the one or more face parts in the image, program instructions to remove the one or more overlapped face parts from the set the one or more of face parts.

16. The computer system of claim 13, the stored program instructions further comprising, responsive to determining the quantity of the one or more existing templates is not less than a pre-defined maximum quantity, program instructions to update a first template of the one or more existing templates, wherein the first template most closely matches the normalized image.

17. The computer system of claim 13, wherein the program instructions to determine the recognition score of the at least one face comprise program instructions to use a trained convolution deep neural network.

* * * * *